(12) United States Patent
Pos

(10) Patent No.: US 10,730,412 B2
(45) Date of Patent: Aug. 4, 2020

(54) CHILD SEAT FOR ATTACHING TO A MOTOR VEHICLE SEEAT

(71) Applicant: CYBEX GmbH, Bayreuth (DE)

(72) Inventor: Martin Pos, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 0 days.

(21) Appl. No.: 15/758,851

(22) PCT Filed: Sep. 9, 2016

(86) PCT No.: PCT/EP2016/071298
§ 371 (c)(1),
(2) Date: Mar. 9, 2018

(87) PCT Pub. No.: WO2017/042330
PCT Pub. Date: Mar. 16, 2017

(65) Prior Publication Data
US 2019/0031052 A1    Jan. 31, 2019

(30) Foreign Application Priority Data

Sep. 9, 2015   (DE) .................... 20 2015 104 792 U

(51) Int. Cl.
*B60N 2/28*    (2006.01)
(52) U.S. Cl.
CPC ........... *B60N 2/2824* (2013.01); *B60N 2/286* (2013.01)
(58) Field of Classification Search
CPC ........ B60N 2/2824; B60N 2/286; B60N 2/28; B60N 2/2893; B60N 2/01575; B60N 2/2827; B60N 2/289

(Continued)

(56) References Cited

U.S. PATENT DOCUMENTS

| 5,487,588 | A * | 1/1996 | Burleigh | ............... B60N 2/2806 297/250.1 |
| 2003/0020308 | A1 * | 1/2003 | Pacella | ................ B60N 2/2806 297/256.16 |

(Continued)

FOREIGN PATENT DOCUMENTS

| CN | 204077432 U | 1/2015 |
| DE | 202013103189 | 11/2013 |

(Continued)

OTHER PUBLICATIONS

Machine Translation of Cassais (FR 2864482). (Year: 2019).*

(Continued)

*Primary Examiner* — Mark R Wendell
(74) *Attorney, Agent, or Firm* — Schwegman Lundberg & Woessner, P.A.

(57) ABSTRACT

The invention relates to a child seat for attaching to a motor vehicle seat, comprising a seat element as well as at least one support leg for supporting the child seat on a ground surface, in particular the footwell of the motor vehicle, wherein a display device is provided that is designed to display a ground contact of the support leg with the ground surface, in particular footwell, wherein the support leg has at least one upper telescopic section and a lower telescopic section, which can be moved against one another for lengthening and shortening the support leg, wherein an operative connection is present between the lower telescopic section and the display device, which is designed such that a shifting of the lower section in relation to the upper section leads to a releasing of the display device due to a ground contact of a support leg end.

20 Claims, 2 Drawing Sheets

(58) Field of Classification Search
USPC .................................................... 297/250.1
See application file for complete search history.

(56) References Cited

U.S. PATENT DOCUMENTS

| | | | | |
|---|---|---|---|---|
| 2006/0055218 A1* | 3/2006 | Barker | ................. | B60N 2/2803 |
| | | | | 297/250.1 |
| 2007/0069562 A1* | 3/2007 | Van Montfort | ........ | B60N 2/286 |
| | | | | 297/253 |
| 2008/0224516 A1* | 9/2008 | Vegt | ..................... | B60N 2/2824 |
| | | | | 297/256.16 |
| 2008/0303321 A1* | 12/2008 | Powell | ................. | B60N 2/2824 |
| | | | | 297/216.11 |
| 2008/0315647 A1* | 12/2008 | Carine | ................. | B60N 2/2824 |
| | | | | 297/250.1 |
| 2010/0052384 A1* | 3/2010 | Yang | ................... | B60N 2/2824 |
| | | | | 297/253 |
| 2014/0001800 A1* | 1/2014 | Mo | ..................... | B60N 2/2824 |
| | | | | 297/216.11 |
| 2014/0327281 A1* | 11/2014 | Hou | ..................... | B60N 2/2821 |
| | | | | 297/217.1 |
| 2015/0091343 A1* | 4/2015 | Cheng | ................. | B60N 2/2821 |
| | | | | 297/216.11 |
| 2016/0200225 A1* | 7/2016 | Van Der Veer | ...... | B60N 2/2812 |
| | | | | 297/256.16 |
| 2019/0077281 A1* | 3/2019 | Bohm | ................. | B60N 2/2824 |

FOREIGN PATENT DOCUMENTS

| | | |
|---|---|---|
| FR | 2864482 | 7/2005 |
| JP | 2006-335266 A | 12/2006 |
| JP | 2016-007933 A | 1/2016 |
| WO | WO-2013189819 | 12/2013 |
| WO | WO-2017042330 | 3/2017 |

OTHER PUBLICATIONS

"International Application No. PCT/EP2016/071298, International Search Report and Written Opinion dated Dec. 1, 2016", (Dec. 1, 2016), 11 pgs.

"Chinese Application Serial No. 201680061121.4, First Office Action dated Oct. 8, 2019", (w/ English Translation), 13 pgs.

"Japanese Application No. 2018-512887, Office Action dated Sep. 10, 2019", (w/ English Translation), (Sep. 10, 2019), 9 pgs.

* cited by examiner

CHILD SEAT FOR ATTACHING TO A MOTOR VEHICLE SEEAT

PRIORITY CLAIM TO RELATED APPLICATIONS

This application is a U.S. national stage filing under 35 U.S.C. § 371 from International Application No. PCT/EP2016/071298, filed on 9 Sep. 2016, and published as WO2017/042330 on 16 Mar. 2017, which claims the benefit under 35 U.S.C. 119 to German Application No. 20 2015 104 792.4, filed on 9 Sep. 2015; the benefit of priority of each of which is claimed herein, and which applications and publication are hereby incorporated herein by reference in their entirety.

The invention relates to a child seat for attaching to a motor vehicle seat according to claim 1.

In this context, it should be noted that in the context of this invention, the term "child seat" is to be understood as a generic term for (classic) child car seats and baby carriers. Thus, features provided for a child seat are basically also applicable in the context of this invention to a baby carrier and vice versa, unless otherwise stated. The same applies to the term "child", which is also to be understood as a generic term for children and babies as well as toddlers.

A generic child seat is known for example from WO 2013/189819 A1. There is also shown a support leg (in FIG. 1) via which the child seat can be supported on a base (the footwell).

It is an object of the invention to provide a display facility via which the user can be informed when the support leg is in contact with the ground, wherein the display should preferably be provided as simple and secure as possible.

This object is achieved by a child seat according to claim 1.

In particular, the object is achieved by a child seat for attachment to a motor vehicle seat, comprising a seat element and at least one support leg for supporting the child seat on a base surface, in particular footwell of a motor vehicle, wherein a display device is provided which is designed to display a ground contact of the support leg with the base surface, in particular the footwell, wherein the support leg has at least one upper telescopic section and at least one lower telescopic section, which are displaceable against each other for lengthening and shortening of the support leg, wherein an operative connection is present between the lower telescopic section and the display device, which is designed such that a shifting of the lower section in relation to the upper section leads to a triggering of the display device due to a ground contact of a (lower or distal) support leg end.

A key concept of the present invention is to exploit in terms of displaying the ground contact that the first section and second section are in principle mutually displaceable with respect to each other and to further exploit that due to a ground contact a certain force acts on the lower section, via which a displacement of the lower section in relation to the upper section can be made possible. In particular, according to the invention, therefore no electronic sensor is necessary which is arranged on a foot of the support leg and controls a display device, for which a comparatively expensive electronic system would be necessary and also a battery that may need to be replaced after a certain period of time. The operative connection with the lower section of the support leg also allows actuation to occur in a clearly defined manner (since the relative movement between the upper and lower sections is utilized), such that a wobbling motion or canting (as in a solution for example in which a displaceable element is arranged in a proximal end section of the support leg) is avoided or at least reduced during triggering of the display device.

Concretely, the operative connection is designed to mechanically transmit a (compressive) force from the lower section to the display device. In general, the operative connection is a mechanical (force-transmitting) operative connection. In particular, an electrical transmission or other electrical or electronic components can be dispensed with completely. This increases the reliability of the display of the ground contact with simple means.

In a specific embodiment, the operative connection comprises a rod. This rod may have a round, elliptical or polygonal cross-section, e.g. rectangular cross-section, or profile-like cross-section, such as a U-shaped or C-shaped cross-section. This allows a structurally simple way of transferring the effect, which reduces costs.

The operative connection and/or the rod may have a length which is at least 60%, preferably at least 80%, of the length of the upper section. The operative connection and/or the rod can have a length of at least 10 cm, preferably at least 15 cm.

Preferably, a locking device for setting (or locking) a relative position between the first and second section is provided. Further preferably, in the locked state, first and second sections are movable by a certain distance, for example less than or equal to 2 cm. The distance can be at least 3 mm. This makes it possible that in the locked state (in which the length of the support leg, apart from the aforementioned distance, is determined in principle) a certain (predefined) relative movement is still permitted, so that the display device can be triggered via the operative connection. As a result, the locking device (at least partially) assumes the task of detecting the ground contact, generally resulting in a simple and inexpensive, yet reliable, structure.

The locking device may comprise a slot and/or a locking pin, wherein the locking pin either (only), namely in the locked position, can slide within the slot, or is actuated such that first and second section can move freely against each other, up to a maximum (or minimal) setting length of the support leg. The slot is preferably provided in the first section.

The locking pin is preferably connected in the locked position with the lower section such that said section cannot move relative to the locking pin. Overall, a structurally simple way is provided to simultaneously perform a locking between the upper and lower section and to allow easy display of ground contact.

Furthermore, the child seat may have a spring whose first end is fixedly attached to the first section (indirectly or directly) and whose second end is fixedly arranged on the operative connection (directly or indirectly), in particular on the rod, such that the spring pushes the first and second section, in the locked state, away from each other. Preferably, the spring, in the locked state, is indirectly connected to the lower section via the locking device (optionally only via the locking device). This allows a basic position that is assumed by the support leg when no ground contact exists. However, when there is ground contact, the lower section is pushed in the direction of the upper section against the action of the spring by the pressure contact with the ground so that a display of ground contact (via the operative connection) can be realized. Overall, this is a relatively simple structure that can reliably display a ground contact.

In a concrete embodiment, the operative connection, in particular the rod, in the locked state, is fixedly connected to the second section and is movable relative to the first section. This measure also facilitates reliable display of ground contact.

The operative connection, in particular the rod, in the unlocked state in which the length of the support leg can be adjusted, can be movable both in relation to the first section and relative to the second section. In particular, in the unlocked state, the operative connection (and/or the rod) is movable only by the above-mentioned (small) travel distance relative to the upper section, but freely movable relative to the lower section (only limited by the maximum possible displacement of the upper and lower sections relative to one another, in the unlocked state).

Preferably, the display device is arranged at a proximal end of the support leg. This ensures in a simple manner that the user can see the display device.

The upper section may enclose the lower section in the overlapping area.

The upper section and/or the lower section may be formed by a tube (or profile, for example, C- or U-profile). The upper section is preferably an outer tube (or outer C- or U-profile). The lower section is preferably an inner tube (or inner profile, in particular C-profile or U-profile). Thereby, the adjustment of the length of the support leg can be simplified.

Further embodiments of the invention will become apparent from the dependent claims.

The support leg is disclosed and claimed as an independent subject matter of the invention. In particular, all feature combinations attributable to the support leg and its elements are disclosed and claimed as a separate invention.

Apart from the support leg, the child seat can be designed as described in WO 2013/189819.

The invention will be described below with reference to an embodiment which is explained in more detail with reference to the figures, wherein.

In the following description, the same reference numerals are used for identical and equivalent parts.

Figure 1:
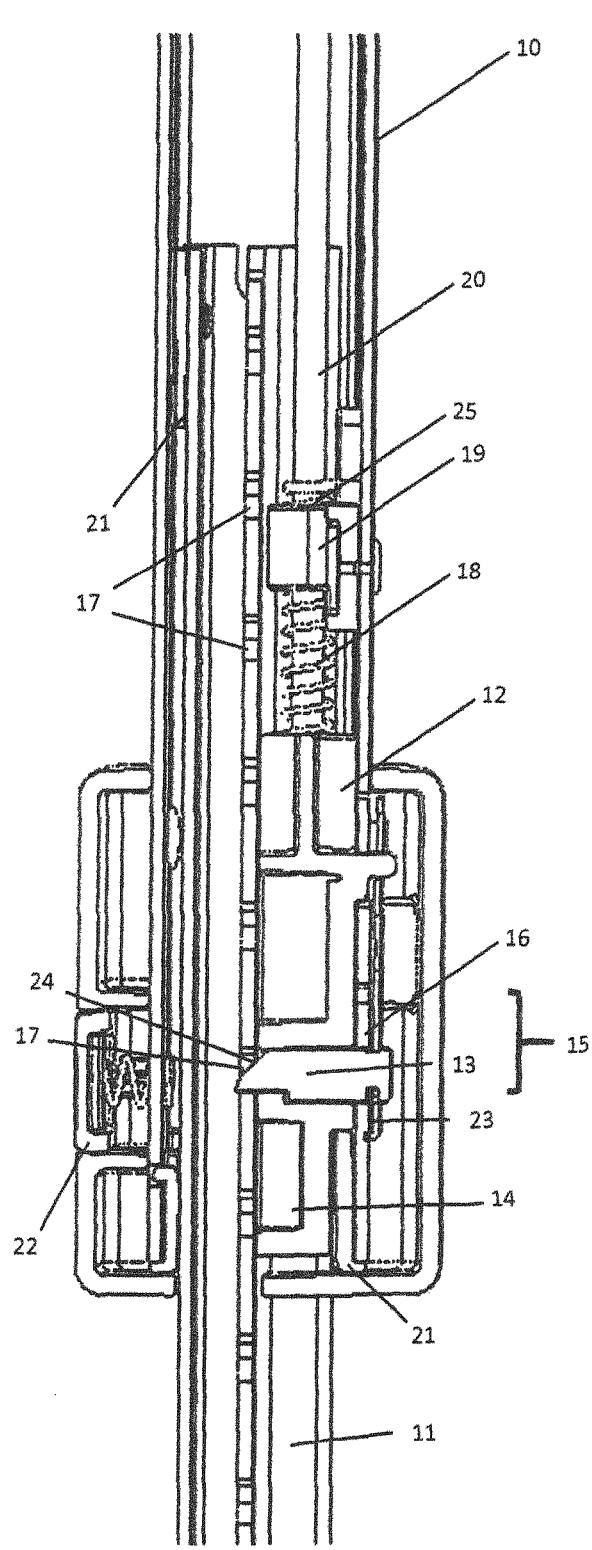
FIG. 1 shows a section of the support leg in a schematic sectional view, in a locked state.

FIG. 1 shows a section of a support leg with an upper section 10 and a lower section 11. The upper section 10 is closer to a seat surface (not shown) of the child seat. The lower section 11 is closer to a foot (not shown) of the support leg.

The telescopic support leg comprises in the present case exactly the two sections 10, 11 which are telescopically displaceable against each other. However, it is not excluded that further (possibly telescopically displaceable) sections are provided.

The lower section 11 is guided within the upper section 10 (in an overlapping area).

Figure 2:
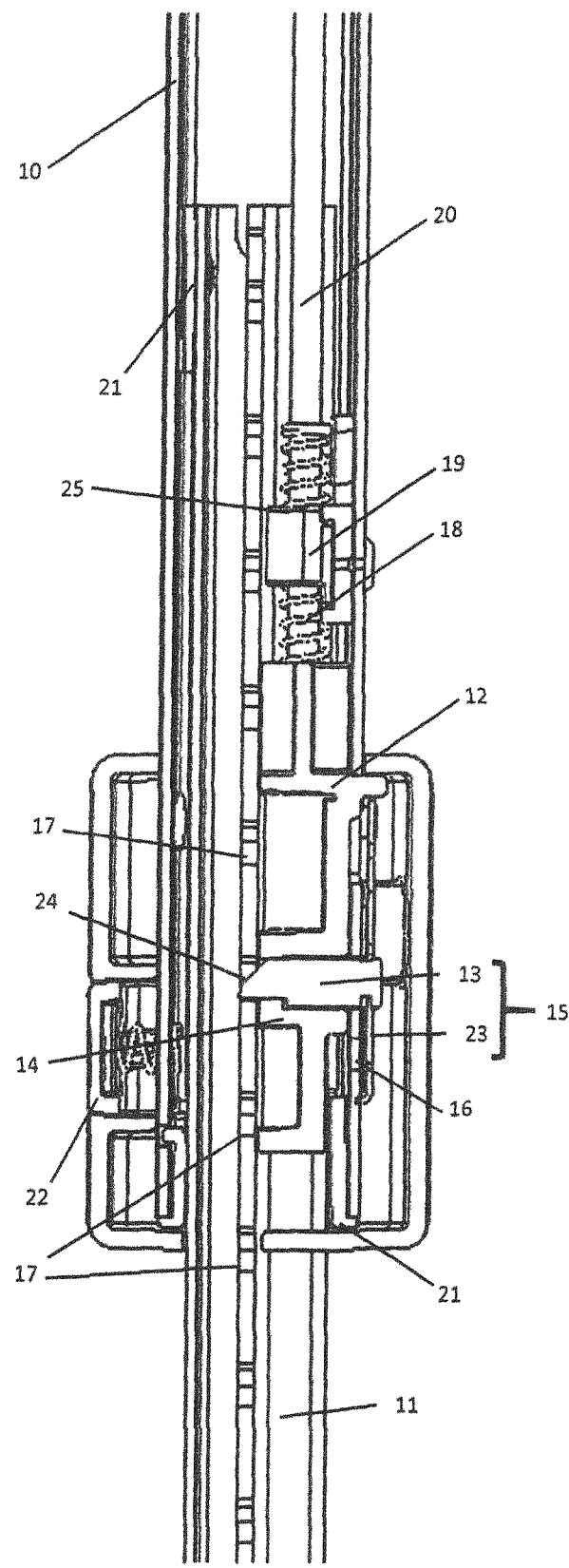
FIG. 2 shows a sectional view according to FIG. 1 after ground contact.

A locking device 12 comprises a base part 14 and a locking pin 13. In the locked state of the support leg shown in FIGS. 1 and 2 (but also in principle in the unlocked state), the locking device 12 can move relative to the upper section 10, namely by a distance 15, which is defined by a recess (slot) 16. In the locked state in FIGS. 1 and 2, the locking pin 13 engages positively in a recess 17 (a plurality of recesses 17) of the lower section, so that the lower section 11 cannot move relative to the locking device. A spring 18 causes that in an unloaded state of the support leg (as shown in FIG. 1), the locking device 12 is urged in the downward direction together with the lower section 11. In this context, it should be noted that the spring 18 shown in FIGS. 1 and 2 is shown purely schematically and in particular the (in FIGS. 1 and 2) upper end of the spring 18 is positioned equal to a stop 19. In other words, the spring 18 acts between the stop 19 fixedly attached to the upper section 10 and the locking means 12. An upper end of the spring may abut, for example, (inside) an upper end 25 of the stop 19 (both in FIG. 1 as well as in FIG. 2). The stop 19 is fixedly connected to the upper section.

Now, when a ground contact of the support leg takes place, it results in a (pressure) force which presses the lower section or the locking device 12 against the spring force in the upward direction, so that the position in FIG. 2 is reached.

The locking device 12 is connected to a rod 20, whose upper end (not shown in FIGS. 1 and 2) is in turn connected to a display device (indirectly or directly) or itself forms a display device. For example, it is conceivable that an upper end of the rod 20 protrudes from an opening (when the position shown in FIG. 2 is present) or disappears within an opening (when the position shown in FIG. 1 is present). Alternatively, it is also possible for an upper end of the rod 20 to transfer a mechanical display device to a first position when the position shown in FIG. 2 is present and to a second position when the position shown in FIG. 1 is present. For example, the display device could then make a green area visible if there is ground contact according to FIG. 2 or a red area if such ground contact is not present.

Guide parts 21 allow efficient guidance of the lower section 11 within the upper section 10. In this case, the wide distance between these guide parts is exploited from each other, on the one hand to allow reliable adjustment of the leg length and on the other hand to be able to reliably indicate a ground contact. Wobbling or tilting is thereby avoided (or at least minimized) when the display device is triggered.

The locking pin 13 is displaceable so that it is either engaged only with the recess 16 (unlocked position) or (as shown in FIGS. 1 and 2) is both in connection with the recess 16 of the upper section 10 and is introduced into one of the recesses 17 of the lower section 11. For the corresponding displacement of the locking pin 13, customary devices may be provided for this purpose (which devices are not recognizable in detail in the present case). For example, a (possibly spring-loaded) operating knob 22 and/or a pulling device can contribute to this, which is indicated by the reference numeral 23 and optionally brings the locking pin by pulling, for example, to the unlocked position as a result of a displacement (e.g. carried out by the operating knob), and/or a geometry of the locking pin 13, e.g. an inclined surface 24.

Figure 3:
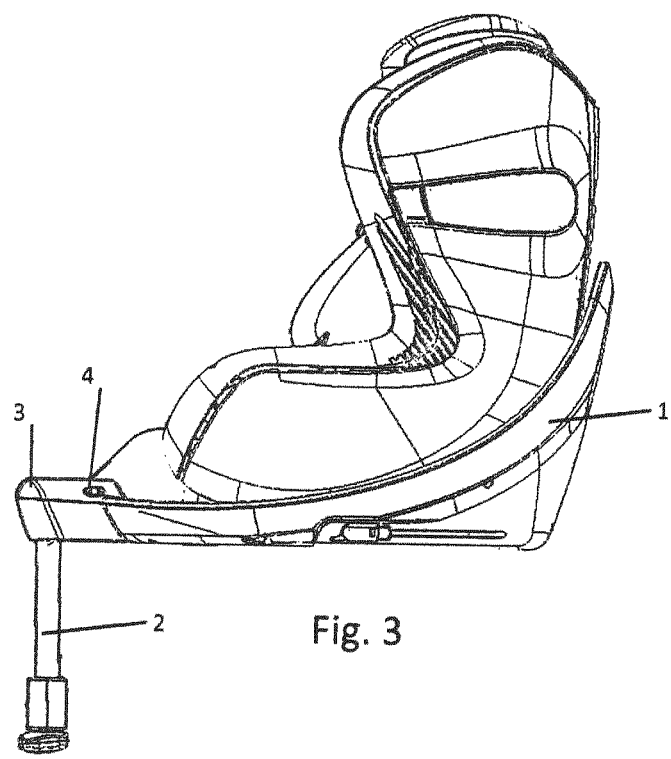
FIG. 3 shows a child seat according to the invention in a side view.

In FIG. 3, the entire child seat, comprising a seat element 1 (having a base and a seat pan) and a support leg 2, is shown. A possible display device is indicated schematically by the reference numeral 3. Additionally or alternatively, the display device may also be located at reference numeral 4.

It should be noted at this point that all the above-described parts taken alone and in any combination, in particular the details shown in the drawings, are claimed as essential to the invention. Variations thereof are familiar to the person skilled in the art.

LIST OF REFERENCE NUMERALS

1 Seat element
2 Support leg
3 Display device

4 Display device
10 Upper section
11 Lower section
12 Locking device
13 Locking pin
14 Base part
15 Distance
16 Recess
17 Recess
18 Spring
19 Stop
20 Rod
21 Guide part
22 Operating knob
23 Pulling device
24 Inclined surface
25 Upper end

The invention claimed is:

1. A child seat for attachment to a motor vehicle seat, the child seat comprising:
   a seat element and at least one support leg configured to support the child seat on a base surface of a motor vehicle, the support leg having at least one upper telescopic section and at least one lower telescopic section that are displaceable relative to each other for lengthening and shortening the support leg;
   a display device to display a ground contact of the support leg with the base surface; and
   an operative connection between the lower telescopic section and the display device, wherein the operative connection includes, at least in sections, a locking device configured to set a relative position of the upper telescopic section with respect to the lower telescopic section to fit different vehicle geometries, and
   wherein a displacement of the lower telescopic section relative to the upper telescopic section leads to a triggering of the display device due to a ground contact of a support leg end.

2. The child seat according to claim 1, wherein the operative connection is configured to mechanically transmit a force from the lower telescopic section to the display device.

3. The child seat according to claim 2, wherein the operative connection comprises a rod.

4. The child seat according to claim 2, wherein the base surface includes a footwell of a motor vehicle.

5. The child seat according to claim 1, wherein the locking device is configured to adjust a relative position between the upper and lower telescopic sections, wherein the upper and lower telescopic sections are movable in a locked state by a predetermined distance.

6. The child seat according to claim 5, wherein the specified distance is less than 2 cm.

7. The child seat according to claim 1, wherein the locking device is configured to lock a relative position between the upper and lower telescopic sections such that the locking device cooperates with a recess and/or a slot.

8. The child seat according to claim 7, wherein the locking device has a locking pin, and wherein the locking pin can slide within the recess and/or the slot in the latched position, or is actuated such that the upper and lower telescopic sections can move freely against each other up to a predetermined maximum length of the support leg.

9. The child seat according to claim 1, further comprising a spring extending from a first end to a second end, wherein the first end is fixedly attached to the upper telescopic section and the second end is fixedly arranged on the operative connection such that the spring urges the upper and lower telescopic sections away from each other in a locked state.

10. The child seat according to claim 1, wherein the operative connection, in a locked state, is fixedly connected to the lower telescopic section and is movable relative to the upper telescopic section.

11. The child seat according to claim 1, wherein the operative connection, in an unlocked state in which the length of the support leg can be adjusted, is movable both with respect to the upper telescopic section and also the lower telescopic section.

12. The child seat according to claim 1, wherein the display device is arranged at a proximal end of the support leg.

13. The child seat according to claim 1, wherein the upper telescopic section surrounds the lower telescopic section in an overlapping region.

14. The child seat according to claim 1, wherein the upper and/or the lower telescopic section is formed by a tube or a profile, wherein the upper telescopic section forms an outer tube or an outer profile, and wherein the lower telescopic section forms an inner tube or an inner profile.

15. The child seat according to claim 14, wherein the upper telescopic section forms an outer U-profile or C-profile, and wherein the lower telescopic section forms an inner U-profile or C-profile.

16. The child seat according to claim 1, wherein the operative connection comprises a rod.

17. The child seat of claim 1, wherein the upper telescopic section and the lower telescopic section are selectively securable relative to each other via the locking device.

18. A child seat for attachment to a motor vehicle seat having a base surface, the child seat comprising:
   a seat element; and
   a support leg configured to support the child seat on the base surface, the support leg having:
   an upper telescopic section;
   a lower telescopic section that is displaceable relative to the upper telescopic section;
   an operative connection including a locking device configured to set a relative position of the upper telescopic section and the lower telescopic section; and
   a display device configured to indicate a ground contact of the support leg with the base surface,
   wherein the upper telescopic section and the lower telescopic section are displaceable relative to each other to lengthen or shorten the support leg to accommodate different vehicle geometries, trigger the display device, and selectively secure the locking device to set a relative position of the upper telescopic section with respect to the lower telescopic section, wherein the locking device is selectively securable at a plurality of different relative positions.

19. A child seat for attachment to a motor vehicle having a base surface, the child seat comprising:
   a seat element;
   a support leg configured to support the child seat on the base surface, the support leg having an upper section telescopically engaged with a lower section and securable in a selectable fixed relation with a locking device; and
   a display device configured to indicate a ground contact of the support leg with the base surface, wherein the display is positioned proximate to the seat element and a proximal end of the support leg.

20. The child seat of claim 19, further comprising:
an operative connection including the locking device located between the lower section and the display device, wherein the operative connection causes the display device to be released by a shifting of the lower section in relation to the upper section;
wherein the lower section and the upper section are securable in a selectable fixed relative position with the locking device.

\* \* \* \* \*